Patented Dec. 19, 1933

UNITED STATES PATENT OFFICE 1,940,066

COPPER CONTAINING AZODYESTUFF

Richard Stüsser, Cologne-Deutz, Germany, assignor to General Aniline Works, Inc., New York, N. Y., a corporation of Delaware No Drawing. Application September 29, 1931, Serial No. 565,918, and in Germany October 15, 1930

12 Claims. (Cl. 260—12)

The present invention relates to a process of preparing azodyestuffs containing copper in a complex form and to the products obtainable thereby.

According to my invention azodyestuffs containing copper in a complex form are prepared by treating an azodyestuff containing an alkoxy group in ortho-position to at least one diazotized amino group, said diazotized amino group being coupled with a coupling component suitable for producing azodyestuffs in ortho-position to a hydroxyl group, alkylamino- or phenylamino group as substituent of said coupling component, with an agent yielding copper in a solvent for said azodyestuff in the presence of an organic base, under such conditions that the alkoxy group is split up with the formation of a copper containing azodyestuff.

As starting azodyestuffs there may be enumerated by way of example the following types: R—N=N—R' wherein R means a diazotization component, containing in ortho-position to the azo-bridge an alkoxy group and R' stands for a coupling component, the azo-bridge being attached thereto in ortho-position to a hydroxy-, alkylamino- or phenylamino group as substituent; R—N=N—R'—N=N—R'', wherein R stands for the radical of a diazotization component, R' stands for a coupling component capable of being diazotized (middle component) and R'' stands for the radical of a coupling component, and wherein R or R', or R and R' contain an alkoxy group or alkoxy groups respectively in ortho-position to their diazotized amino group or -groups, the components to which the said diazotized amino groups are attached bearing in ortho-position to the azo-bridge a hydroxy, alkylamino- or phenylamino group as substituent; R—N=N—R'—N=N—R'', wherein R stands for a radical of a diazotization component, R' stands for a coupling component coupling twice and R'' stands for a diazotization component, the components being selected in such a manner that at least once there is present in the molecule the grouping:

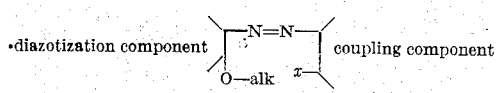

"alk" meaning an alkyl group and $x$ standing for a hydroxy-, alkylamino- or phenylamino group.

In carrying out the invention the dyestuff to be coppered is dissolved in a suitable solvent, such as for example, in water, ethyl alcohol, a mixture of water and ethyl alcohol, benzene, and to the azodyestuff dissolved there is added an organic base, such as pyridine, hexahydroethylaniline, dimethylamine, etc.; the quantity of the organic base added may be varied within the widest limits, generally I add about 10 to about 50% of the organic base. In case the dyestuff is soluble in the pure base, the coppering may be performed in the base without the addition of another base. Then the necessary quantity of the copper compound yielding copper, such as a suitable salt of mono- and divalent copper, is added, and the whole is heated at temperatures between about 50 and 170° C. until the alkoxy group or -groups present in the molecule have been split up with the formation of the copper compound of the azodyestuff. The temperature required for my new coppering process depends somewhat upon the constitution of the starting dyestuff, and every one skilled in the art will find out the suitable temperature.

The proceeding of the coppering process is connected with a change in the coloration of the azodyestuff, and the process is finished when the coloration no longer alters. Generally the process is complete in 1 to 2 hours. A preferred method of carrying out the process consists in refluxing the reaction mixture for the period required, but it is to be understood that in cases where temperatures higher than the boiling point are required, the process is to be carried out under pressure.

My copper compounds are generally powders of various shades, and if they contain a sulfonic acid- or carboxylic acid group soluble in water, dyeing fibres various shades of good fastness properties.

The invention is illustrated by the following examples, without being limited thereto:

*Example 1.*—20 grams of the monoazodyestuff from one molecular proportion of diazotized 4-nitro-2-amino-1-methoxybenzene and one molecular proportion of 2-naphthol-6-sulfonic acid are boiled for a short time in one litre of water with 15 grams of copper sulfate and 50 ccs. of pyridine. The copper compound which separates having in its free state most probably the following formula:

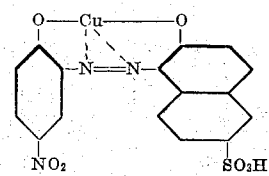

is filtered and dried. In this manner a dark powder is obtained which dyes wool Bordeaux red.

*Example 2.*—20 grams of the disazodyestuff from 2 molecular proportions of 2-amino-1-methoxy-benzene-4-sulfonic acid and one molecular proportion of 5.5'-dihydroxy-2.2'-dinaphthylamine-7.7'-disulfonic acid are boiled for 2 hours under reflux in one litre of water with 8 grams of cuprous chloride and 40 ccs. of pyridine. The original bluish red solution becomes continuously more violet until after 2 hours boiling the coloration of the dyestuff no longer alters. By salting out and filtering, a copper compound having in its free state the following formula:

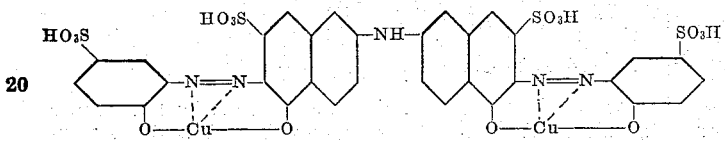

is obtained, which after drying dissolves in water with a violet coloration and dyes cotton, silk and viscose silk violet shades. The dyeings are fast to alkali and very fast to light.

*Example 3.*—By replacing the pyridine in Example 2 by dimethylamine a dyestuff is likewise obtained, which dyes cotton, silk and viscose silk violet shades.

*Example 4.*—By replacing the pyridine in Example 2 by hexahydroethylaniline a reddish violet dyestuff is obtained after prolonged boiling, which dyes cotton, silk and viscose silk violet shades.

*Example 5.*—30 grams of the azodyestuff from one molecular proportion of 2-amino-1-methoxy-benzene-4-sulfo-methylamide, one molecular proportion of 5.5'-dihydroxy-2.2'-dinaphthyl-amine-7.7'-disulfonic acid and one molecular proportion of 2-amino-1-methoxybenzene-4-sulfonic acid are boiled under reflux in one litre of water with 15 grams of copper sulfate and 50 ccs. of pyridine until a change in the coloration no longer takes place. The copper compound of the dyestuff having in its free state the following formula:

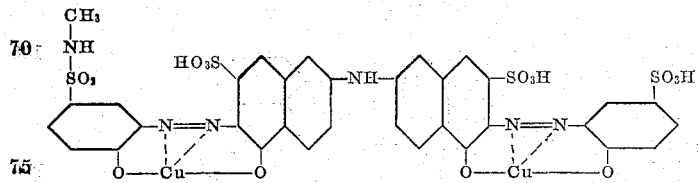

is filtered off, dissolved in hot water by means of caustic soda lye, filtered and salted out from the filtrate. After filtering and drying, a dark powder is obtained, which dissolves in water with a violet coloration and dyes cotton a violet shade, fast to light.

*Example 6.*—20 grams of the disazodyestuff from 2 molecular proportions of 2-amino-1-methoxybenzene-4-sulfonic acid and one molecular proportion of 5.5'-dihydroxy-2.2'-dinaphthylurea-7.7'-disulfonic acid are boiled under reflux in one litre of water with 16 grams of copper sulfate and 40 ccs. of pyridine until the coloration no longer alters. The copper compound of the dyestuff separates out, it is filtered and dried.

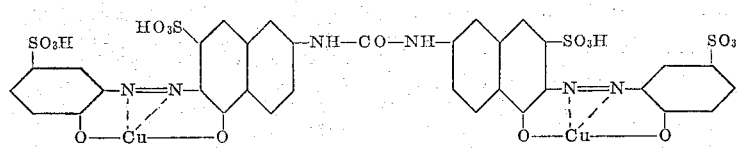

It is a dark powder, which dyes cotton, silk and viscose silk in bluish red shades, fast to alkalies and light. In its free state the copper compound of the dyestuff has the following formula:

*Example 7.*—20 grams of the disazodyestuff from one molecular proportion of 3.3'-dimethoxy-4.4'-diaminodiphenyl and two molecular proportions of 1-p-sulfophenyl-3-methyl-5-pyrazolone are boiled under reflux in one litre of water with 14 grams of copper sulfate and 30 ccs. of pyridine until on mixing a test portion with caustic soda lye a bluish red coloration is obtained, which no longer alters on prolonged boiling.

The original yellow dyestuff has then been converted into a bluish red copper compound possessing in its free state the following formula:

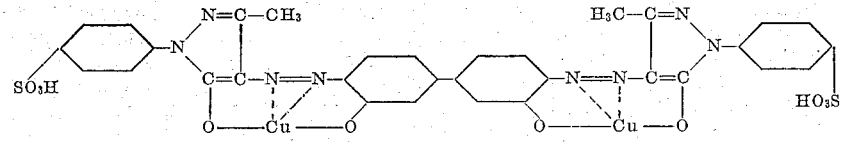

and dyeing cotton, silk and viscose silk in bluish red shades, fast to alkalies and light.

*Example 8.*—20 grams of the disazodyestuff from 3.3'-dimethoxy-4.4'-diaminodiphenylurea and two molecular proportions of 2-hydroxynaphthalene-6-sulfonic acid are boiled under reflux in one litre of water with 14 grams of copper sulfate and 50 ccs. of pyridine until the coloration no longer alters. After working up, a dark powder is obtained which dissolves in water with a reddish violet coloration. In its free state the copper compound of the dyestuff possesses the following formula:

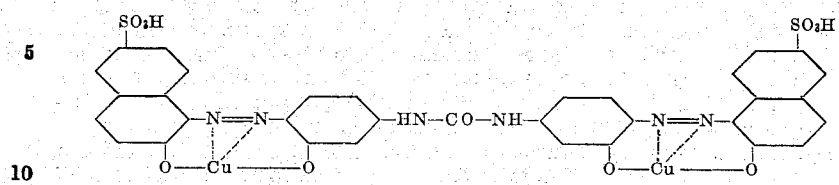

*Example 9.*—20 grams of the azodyestuff prepared from one molecular proportion of diazotized 5-nitro-2-amino-1-hydroxybenzene-methyl-ether-4-sulfonic acid and one molecular proportion of 2 - phenylaminonaphthalene - 6 - sulfonic acid are heated with one litre of water, 20 ccs. of pyridine and 10 grams of copper sulfate for about 1 hour under reflux. The copper compound having in its free state the following formula:

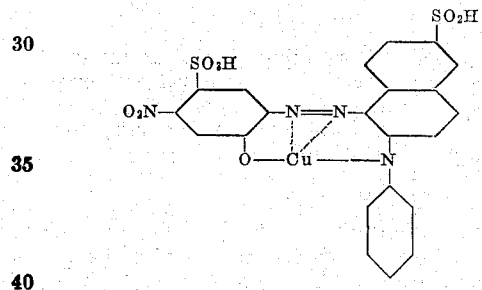

is filtered and dried. It is a dark powder, soluble in water with a violet coloration.

*Example 10.*—20 grams of the azodyestuff prepared from one molecular proportion of diazotized aniline-2-sulfonic acid and one molecular proportion of 1-amino-2-ethoxynaphthalene-6-sulfonic acid, further diazotized and coupled with one molecular proportion of 2-phenylamino-5-hydroxynaphthalene-7-sulfonic acid are refluxed for about 3 hours in one litre of water with the addition of 200 ccs. of pyridine and 20 grams of copper sulfate. The copper compound of the dyestuff which has partially separated is completely precipitated by the addition of common salt, filtered, re-dissolved in hot water, salted out and dried. The dyestuff having in its free state the following formula:

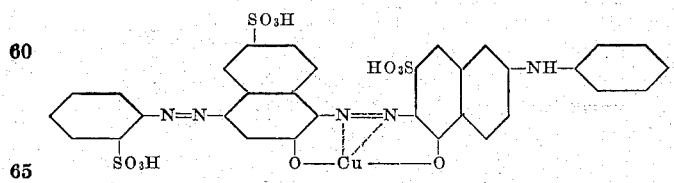

is in form of its alkali metal salt a dark powder, soluble in water with a bluish coloration, dyeing the vegetable fibre blue shades of good fastness properties.

*Example 11.*—20 grams of the azodyestuff prepared from two molecular proportions of diazotized 1.3-dimethyl - 4 - aminobenzene-5-sulfonic acid, coupled with two molecular proportions of 1-methyl-4-methoxy-3-aminobenzene, again diazotized and coupled with 1 molecular proportion of 5.5 - dihydroxy-2.2'-dinaphthylamine-7.7'-disulfonic acid are dissolved in 1 litre of hot water and refluxed for about 2 hours with the addition of 50 ccs. of pyridine and 15 grams of copper sulfate. During the process the coloration of the solution is turned to greenish-blue. The copper compound of the dyestuff having in the free state the following formula:

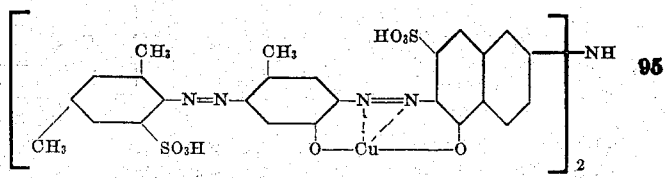

is filtered, re-dissolved in hot water, filtered after cooling and dried. In form of its alkali metal salts it is a black powder, soluble in water with a blue coloration, dyeing the vegetable fibre blue shades of good fastness to ironing and light.

I claim:

1. The process which comprises heating an azodyestuff containing at least once the grouping

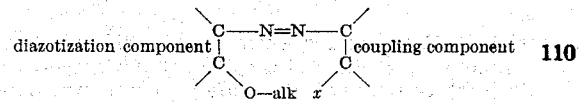

wherein "alk" stands for an alkyl group and $x$ stands for a hydroxy-, alkylamino or phenylamino group, in solution in the presence of an organic base and with the addition of an agent yielding copper until the alkoxy group has been split up with the formation of a copper compound of the azodyestuff.

2. The process which comprises heating an azodyestuff containing at least once the grouping

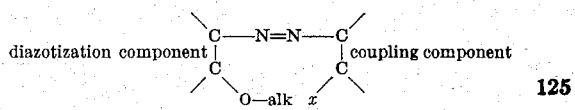

wherein "alk" stands for an alkyl group and $x$ stands for a hydroxy-, alkylamino- or phenylamino group, in solution in the presence of an organic base and with the addition of a water-soluble salt of mono- or bivalent copper at a temperature between 50 and 170° C. until the alkoxy group has been split up with the formation of a copper compound of the azodyestuff.

3. The process which comprises heating an azodyestuff containing at least once the grouping

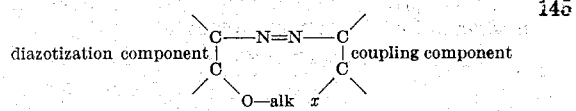

wherein "alk" stands for an alkyl group and $x$ stands for a hydroxy-, alkylamino- or phenylamino group, in solution in the presence of an organic base of the group consisting of pyridine, hexahydroethylaniline, dimethylamine at a temperature between 50 and 170° C. until the alkoxy group has been split up with the formation of a copper compound of the azodyestuff.

4. The process which comprises dissolving an azodyestuff containing at least once the grouping

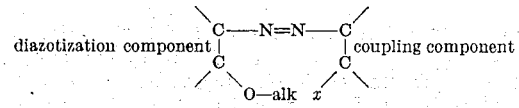

wherein "alk" stands for an alkyl group and $x$ stands for a hydroxy-, alkylamino- or phenylamino group, in aqueous pyridine and heating the same with the addition of a watersoluble salt of mono- or bivalent copper at a temperature between 50 and 170° C. for about 1 to 2 hours.

5. The process which comprises dissolving a dyestuff of the general formula:

$$R-N=N-R'-N=N-R''$$
$$\phantom{R-N=N-}|\phantom{-N=N-R'}|$$
$$\phantom{R-N=N-}O-alk\phantom{-}x$$

wherein R stands for a radical of a diazotization component, R' stands for a radical of a diazotized coupling component, R'' stands for an end component which may contain an azo-group, "alk" stands for alkyl, the alkyloxy group standing in ortho-position to the azo-bridge attached to R'', $x$ standing in ortho-position to the azo-bridge and meaning the hydroxy-, an alkylamino- or phenylamino group, in aqueous pyridine and heating with the addition of copper sulfate at a temperature between 50 and 170° C. until the alkoxy group has been split up.

6. The process which comprises refluxing the azodyestuff of the formula:

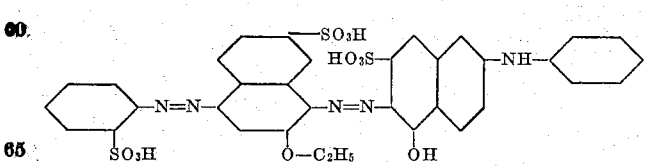

in aqueous pyridine with the addition of copper sulfate for about 3 hours.

7. The process which comprises dissolving an azodyestuff of the general formula:

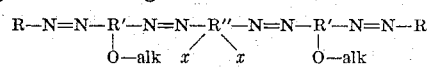

wherein the R's stand for radicals of diazotization components, the R''s stand for radicals of diazotized coupling components, R'' stands for the radical of a coupling component coupling twice, the alk's stand for alkyl groups, the alkoxy groups standing in ortho-position to the azo groups attached to R'', the $x$'s standing in ortho-position to the azobridges and meaning the hydroxy, alkylamino- or phenylamino groups, in aqueous pyridine and heating with the addition of copper sulfate at a temperature between 50 and 170° C. until the alkoxy groups have been split up.

8. The process which comprises refluxing the azodyestuff of the formula:

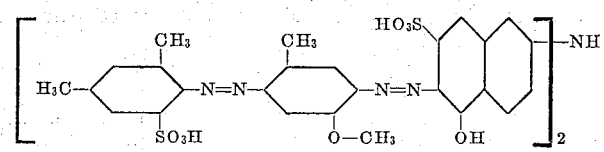

in aqueous pyridine with the addition of copper sulfate for about 2 hours.

9. Copper containing azodyestuffs being characterized by containing at least once the grouping

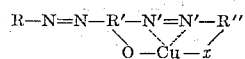

wherein R stands for a radical of a diazotization component, R' stands for a diazotized coupling component, R'' stands for a radical of an end component, $x$ stands for oxygen, >N-alkyl or >N-phenyl, the grouping

standing in ortho-position to the azo-bridge $-N'=N'-$, being generally dark powders, yielding dyeings of good fastness properties.

10. The copper containing azodyestuff of the following formula:

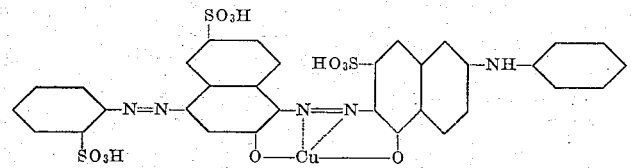

being in form of its alkali metal salt a dark powder, soluble in water with a bluish coloration and dyeing the vegetable fibre blue shades of good fastness properties.

11. Copper containing azodyestuffs of the general formula:

wherein the R's stand for radicals of diazotization components, the R''s stand for radicals of diazotized coupling components, R'' stands for a radical of a coupling component coupling twice, the $x$'s stand for oxygen, >N-alkyl or >N-phenyl, the groupings $$\diagdown O-Cu-x \diagup$$

standing in ortho-position to the azo-bridges, being generally dark powders, yielding dyeings of good fastness properties.

12. The copper containing azodyestuff of the following formula:

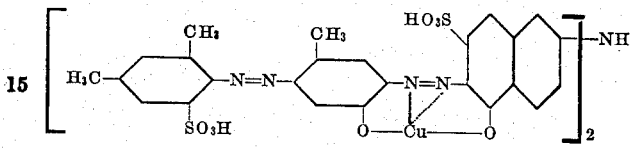

being in form of its alkali metal salts a black powder, soluble in water with a blue coloration and dyeing the vegetable fibre blue shades of good fastness to ironing and light.

RICHARD STÜSSER.